United States Patent
Kuenemund

(10) Patent No.: US 10,483,972 B2
(45) Date of Patent: Nov. 19, 2019

(54) DELAY CIRCUIT

(71) Applicant: Infineon Technologies AG, Neubiberg (DE)

(72) Inventor: Thomas Kuenemund, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 16/183,827

(22) Filed: Nov. 8, 2018

(65) Prior Publication Data

US 2019/0140643 A1    May 9, 2019

(30) Foreign Application Priority Data

Nov. 9, 2017 (DE) .......... 10 2017 126 217

(51) Int. Cl.
*H03K 19/003* (2006.01)
*H03K 17/00* (2006.01)
*H04L 9/32* (2006.01)

(52) U.S. Cl.
CPC ..... *H03K 19/00323* (2013.01); *H03K 17/002* (2013.01); *H04L 9/3278* (2013.01); *H04L 2209/12* (2013.01)

(58) Field of Classification Search
CPC ............ H03K 19/00323; H03K 17/002; H04L 9/3278; H04L 2209/12
See application file for complete search history.

(56) References Cited

U.S. PATENT DOCUMENTS

2015/0008763 A1    1/2015 Kuenemund

FOREIGN PATENT DOCUMENTS

DE   102013106976 B3   8/2014
EP      2320344 A2     5/2011

*Primary Examiner* — Daniel D Chang
(74) *Attorney, Agent, or Firm* — Viering, Jentschura & Partner MBB

(57) ABSTRACT

A delay circuit includes an electronic transmission element with a first input and a first output. The first input is coupled to the first output by two first switches wired in parallel. The first switches each have a control input, a second input and a second output. The second input is coupled to the second output by two second switches wired in parallel. The circuit further includes an input circuit to receive an input signal and feed the input signal to one of the transmission element inputs and feed the inverted input signal to the other of the transmission element inputs, and an output circuit. The output circuit is configured such that the output signal only changes in the case of a change in the input signal if the change in the input signal has brought about a change both at the first output and at the second output.

24 Claims, 7 Drawing Sheets

DELAY CIRCUIT

CROSS-REFERENCE TO RELATED APPLICATION

This application claims priority to German Patent Application Serial No. 10 2017 126 217.2, which was filed Nov. 9, 2017, and is incorporated herein by reference in its entirety.

TECHNICAL FIELD

Various embodiments relate generally to delay circuits.

BACKGROUND

Piracy and reverse engineering (RE) of integrated circuits (ICs) counts as one of the greatest threats to the semiconductor industry since a design can be stolen in the process: a successful attacker can recreate an IC or manufacture and sell a similar (i.e. "cloned") IC, can use said IC illegally or sell extracted and stolen intellectual property and thus disclose trade secrets to a competitor, for example. It is for these reasons that effective concepts and techniques for preventing IC piracy and reverse engineering are desirable.

SUMMARY

A delay circuit includes an electronic transmission element with a first input and a first output. The first input is coupled to the first output by two first switches wired in parallel. The first switches each have a control input, a second input and a second output. The second input is coupled to the second output by two second switches wired in parallel. The circuit further includes an input circuit to receive an input signal and feed the input signal to one of the transmission element inputs and feed the inverted input signal to the other of the transmission element inputs, and an output circuit. The output circuit is configured such that the output signal only changes in the case of a change in the input signal if the change in the input signal has brought about a change both at the first output and at the second output.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying figures showing details and exemplary embodiments. These embodiments are described in sufficient detail that the person skilled in the art can carry out the invention. Other embodiments are also possible and the embodiments can be modified structurally, logically and electrically, without departing from the subject matter of the invention. The various embodiments are not necessarily mutually exclusive, rather different embodiments can be combined with one another to give rise to new embodiments. In the context of this description, the terms "connected" and "coupled" are used to describe both a direct and an indirect connection, and a direct or indirect coupling.

A promising approach for reliable and secure identification and authentication of ICs, as a result of which the use of a recreated IC, for example, can be prevented, consists in using so-called physical random functions or physical unclonable functions (PUFs) for the purposes of producing (PUF) values on a chip, on the basis of which secret keys to cryptographic algorithms are produced. Ideally, silicon-chip-based PUFs produce chip-specific keys, which are reproducible as often as desired but which are not predictable and which cannot be established from the outside. This can be achieved by using random variations in the IC production processes, with measures being taken at the same time to ensure that the PUF value production is independent of global process, temperature and supply voltage variations and noise.

Since a PUF circuit, which realizes a PUF, can be integrated together with a dedicated control logic, an attempt to physically access the PUF circuit can be made more difficult in a very effective and efficient manner. This significant resistance to physical attacks is a substantial advantage of the use of controlled silicon-chip-based PUFs.

Moreover, only weak PUFs are required for producing secret keys, i.e., PUFs that only use a very restricted number of challenge-response pairs (in comparison with the number of possible challenge-response pairs).

The PUF value P can be imagined to be a type of fingerprint of a physical object. By way of the true PUF value P, i.e., the PUF value at its registration, the physical object can be uniquely identified and a key, for example, can be produced on the basis of the identification. The physical object can be a controller or a microcontroller. It may also be a chip card IC (integrated circuit) of a chip card such as a smart card with any form factor, e.g., for a passport or for a SIM (subscriber identity module).

Figure 1:
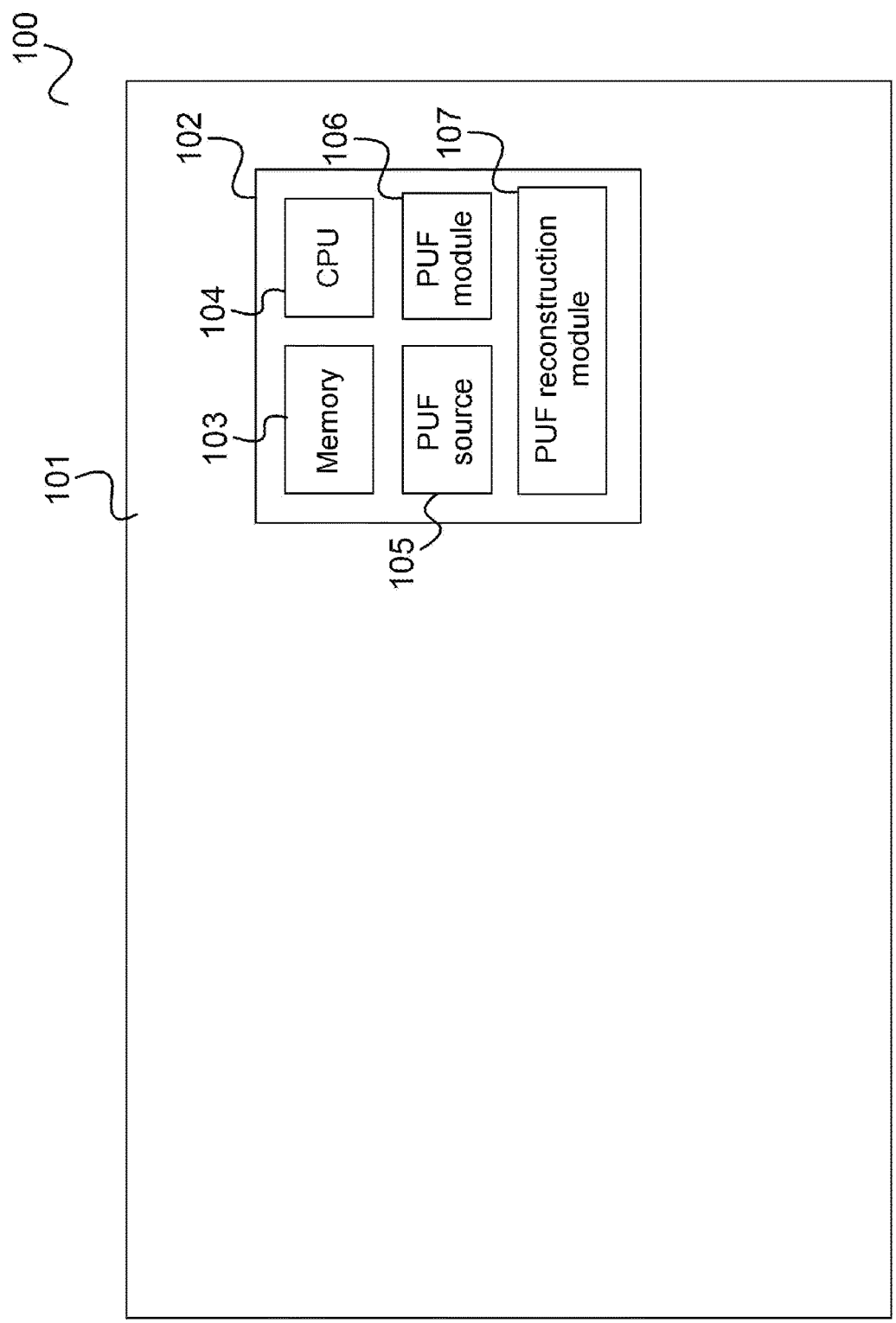
FIG. 1 shows an exemplary chip card.

As an example, FIG. 1 shows a chip card 100.

The chip card 100, which is illustrated here in the card format but may have any form factor, has a carrier and a chip card module 102. The chip card module 102 has various components, such as, e.g., a non-volatile memory 103 and a CPU (central processing unit) 104. In various embodiments, the chip card has a component 105, which serves as a PUF source, for example a memory (e.g., with a multiplicity of SRAM cells), the random initial state of which is used as a PUF value.

The PUF value P can be considered to be an identification number for the chip card 100 (more precisely, for the chip card module 102 in the chip card 100). By way of example, the chip card module 102 has a cryptoprocessor, which derives a chip-card-individual cryptographic key from this identification number or the CPU 104 itself derives a cryptographic key therefrom.

For security reasons, neither the true PUF value P nor the cryptographic key derived therefrom are stored on the chip card 100. Instead, a so-called PUF module 106 is situated on the chip card 100 and connected to the physical object 105. If the PUF value P is required, a so-called PUF request is then made, whereupon the PUF module 106 determines the PUF value anew in each case (by way of an internal measurement). Expressed differently, the PUF module 106 replies to a PUF request with the output of a PUF value P', which may differ to a greater or lesser extent from the true PUF value P, i.e., the PUF value upon registration thereof, depending on the bit stability of the bits supplied by the PUF source 105.

There are various approaches to realize controlled silicon-chip-based PUFs (i.e., PUF sources 105), e.g. SRAM-based, sense-amplifier-based, butterfly-based and latch-based PUF fields on the one hand and delay-based PUFs such as ring oscillator PUFs and arbiter PUFs on the other hand.

SRAM PUFs are based on the process-variation-induced tendency of the individual SRAM memory cells to e.g. adopt one of their two stable states upon activation. However, they typically suffer from severe restrictions such as poor bit stability and high vulnerability in relation to semi-invasive attacks such as electrical and optical probing and/or insufficient statistical quality.

In the case of delay-based PUFs, such as ring oscillator (RO) and arbiter PUFs, in which the delays of two delay lines, ideally with an identical implementation, are compared, there are similar restrictions in respect of the bit stability and the statistical quality, while their known weakness against model-based attacks for a key generation on a chip is irrelevant since the (very small number of) controlled silicon PUF challenge-response pairs are never directly exposed and cannot be established from the outside.

Figure 2:
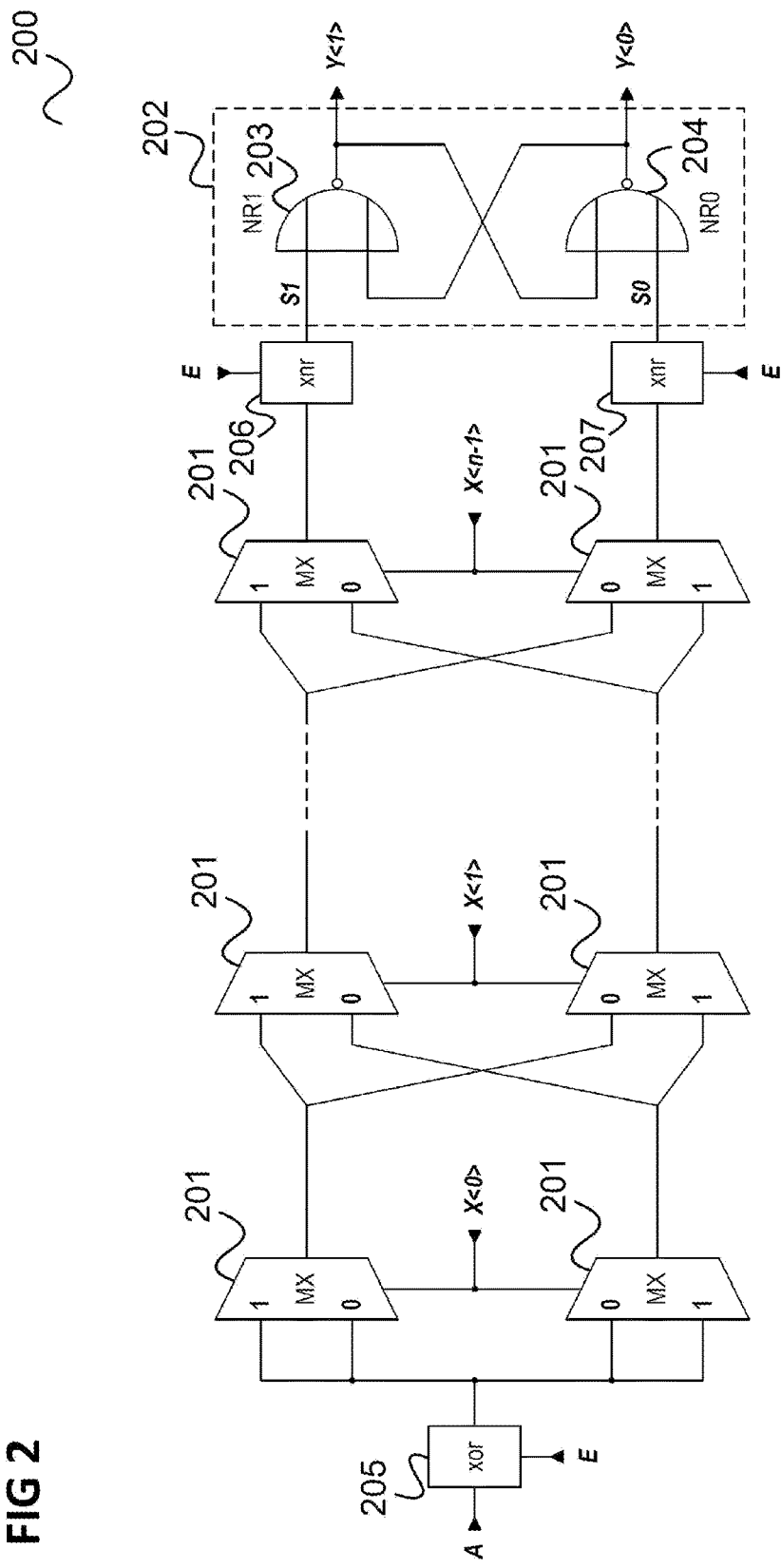
FIG. 2 shows an exemplary circuit for realizing a silicon-chip-based arbiter PUF.

FIG. 2 shows a circuit 200 for realizing a silicon-chip-based arbiter PUF in accordance with exemplary embodiments of the present disclosure.

The arbiter PUF is realized with multiplexers 201 and an arbiter, which is implemented as an RS flip-flop (FF) 202 and which consists of two cross-coupled NOR (NOT OR) gates 203 and 204. The first NOR gate 203 receives a signal S1 and the output signal Y<0> of the second NOR gate 204 and the second NOR gate 204 receives a signal S0 and the output signal Y<1> of the first NOR gate 203.

The circuit 200 has an n-bit input signal X<n−1:0> and calculates an output signal, represented by two complementary bits Y<1:0> (i.e., a dual rail output signal), depending on the delay difference between two paths with the same nominal layout length, formed by the multiplexers 201, starting at the output of an XOR (exclusive OR) gate 205, which receives a start signal A.

The inputs X<j> (j=n−1, . . . , 1, 0) determine the two respective paths by the configuration of the multiplexers 201. A pair of multiplexers 201 controlled by the same input X<j> work as a conditional interchanger: for X<j>=1, said pair transmits its two input signals without interchange to the outputs (from left to right in FIG. 2). For X<j>=0, said pair interchanges the input signals prior to the output thereof. Consequently, the circuit produces $2^n$ different delay paths for each of the $2^n$ possible values of the input signal X<n−1:0>.

Since only weak PUFs are required for the production of secret keys, only a very restricted number of challenge-response pairs (pairs of input signal vector X, output signal Y in the example of FIG. 2) is needed.

A (random) seed and a pseudo-random number generator (such as a linear-feedback shift register, for example) can be used to produce a suitable set of challenges X<n−1:0>.

In addition to the start signal A, the XOR gate 205 receives a control signal E, by means of which the signal edge required for the arbiter PUF bit generation can be set. For E=1, the XOR gate 205 inverts the start signal A and XNOR (exclusive NOR) gates 206, 207, which are wired between the outputs of the last interchanger and the RS FF inputs and likewise have the control signal E as an input signal, realize non-inverting buffers within the signal paths for E=1. For E=0, the XOR gate 205 at the circuit input realizes a non-inverting buffer and the two XNOR gates 206, 207 at the RS FF inputs realize inverters within the signal paths. Consequently, the start value 0 of the start signal A leads to a 1 at the inputs of the arbiter RS FF 202 (independently of E), and so the RS FF 202 is set to a pre-charge value Y<1:0>=00. For the purposes of evaluating the output signal Y<1:0> for a given input X, the start signal has a rising signal edge, i.e., the inputs of both paths are supplied at the same time with a rising signal edge for E=0 and a falling signal edge for E=1. The signal edges run through the two delay paths configured by X and the arbiter RS FF 202 at the outputs of the two paths establishes which of the two paths has the smaller delay.

Y<1:0>=10 applies if a falling signal edge arrives first at the first NOR gate 203 and Y<1:0>=01 applies if a falling signal edge arrives first at the second NOR gate 204. The subsequently arriving falling signal edge no longer changes the value of the output signal Y<1:0> since then S1=S0=0 applies, i.e., the RS FF 202 then is in the data storing state.

As mentioned above, the approach shown in FIG. 2 for implementing silicon-chip-based arbiter PUFs has a relatively poor statistical quality and PUF bit stability.

For example, an irregular placement and automated wiring of the arbiter PUF elements can lead to asymmetric wiring and, as a consequence, to systematic delay differences, i.e., poor statistical quality. Moreover, the delay differences between the two paths with the same nominal layout length only depend on the small process variations of the involved multiplexer gates and the connections thereof, leading to a poor bit stability. In the case of poor bit stability, the production of so-called auxiliary data during the PUF registration and an (in terms of gate number and number of faces and energy distribution) expensive and time-consuming error correction are required during use while reconstructing the key.

A further known measure for improving the PUF bit stability consists in marking stable bits or pre-selecting PUF bits. In the case of the preselection, unstable bits are discarded during the PUF registration and no longer taken into account during the PUF reconstruction.

Embodiments, in which the bit stability and the statistical quality are increased by the introduction of dedicated delay elements, which are extremely sensitive to process variations, are described below.

This also facilitates very effective marking of stable bits or the preselection of PUF bits with an adjustable, predetermined stability in relation to ambient variations (such as temperature and supply voltage), and in relation to aging.

Figure 3:
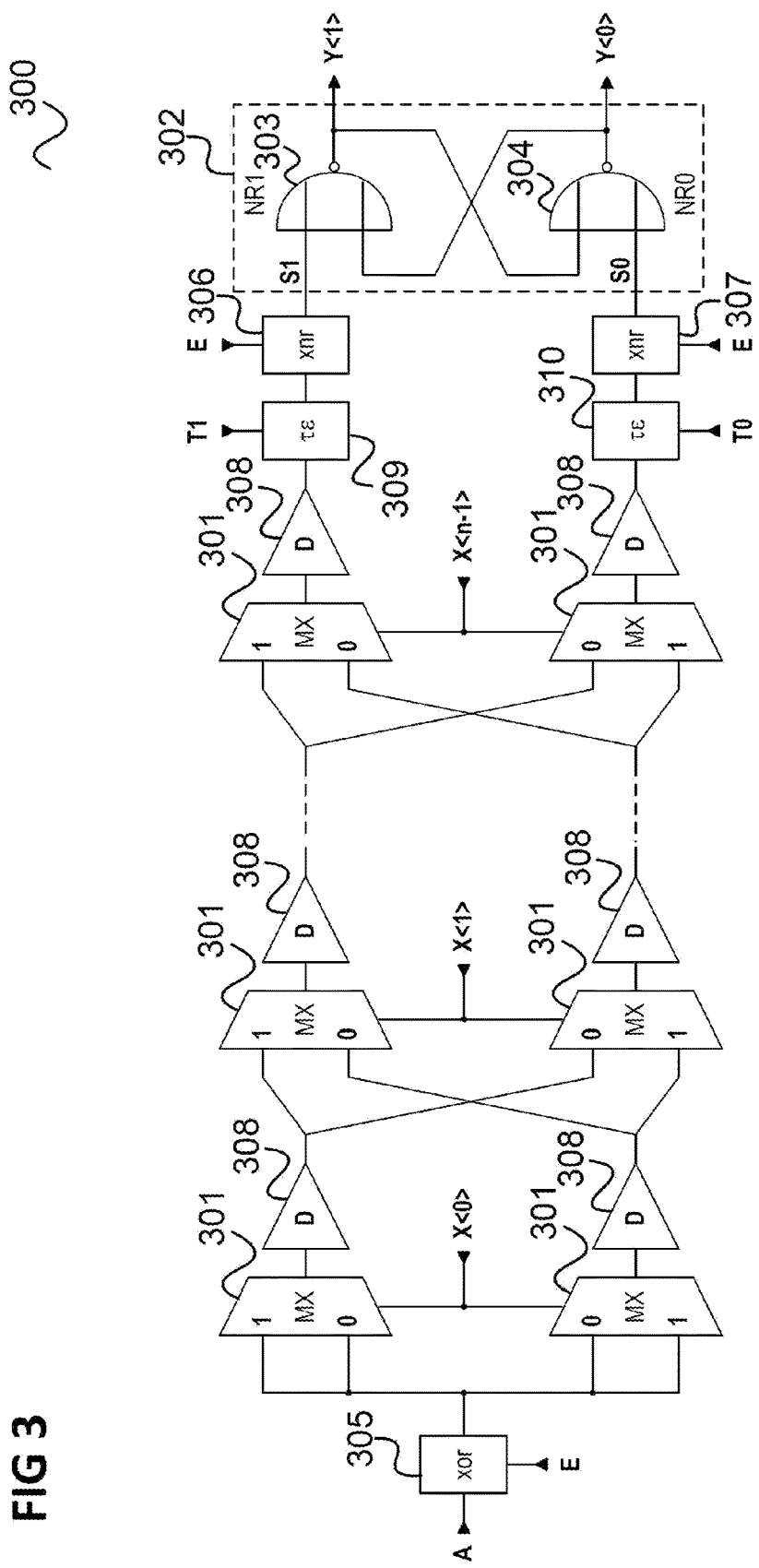
FIG. 3 shows an exemplary circuit for realizing a silicon-chip-based arbiter PUF with additional delay elements.

FIG. 3 shows a circuit 300 for realizing a silicon-chip-based arbiter PUF with additional delay elements in accordance with exemplary embodiments of the present disclosure.

Similar to the circuit 200, the circuit 300 has multiplexers 301, wherein two multiplexers 301 that are fed the same bit X<j> of the n-bit input signal X<1:n> as a control bit form a pair in each case, said pair realizing an interchanger, an RS FF 302 made of two cross-coupled NOR gates 303, 304, an XOR gate 305 at the input of the circuit 300 and two XNOR gates 306, 307 at the inputs of the RS FF 302.

Moreover, a delay buffer 308 is provided at the output of each multiplexer 301, said delay buffer being sensitive in relation to variations (e.g., process variations), which can be seen as an improvement of the multiplexers 301.

According to various embodiments, these variation-sensitive delay buffers 308 are selected in such a way that the signal delay standard deviations thereof are at least ten times greater than the corresponding signal delay standard deviations both of regular standard CMOS gates, i.e., standard CMOS gates, and of the wiring cables. According to a configuration, as described below, the signal delay standard deviations of the delay buffers 308 are even significantly greater than the mean values of the signal delays both of the regular CMOS gates and of the wiring cables. Hence, it is possible to neglect the delays of the standard CMOS gates (e.g., of the multiplexers 301) and the delays of the connecting cables in relation to the delays by the delay buffers 308 in relation to the PUF bit production.

In turn, this means that even an irregular arrangement and wiring (place & route) of the elements of multiplexer 301 and delay element 308 (i.e., the basic arbiter PUF elements in the circuit 300) have no relevant effects on the overall bit stability of the arbiter PUF circuitry. Only the great variation sensitivity of the elements made of multiplexer 301 and delay element 308 plays a role.

Moreover, according to various embodiments, the extreme variation sensitivity of the delay elements 308 is great enough to facilitate an adjustable preselection of PUF bits with a predetermined minimum bit stability. In the circuit 300, this is achieved by virtue of switchable delay elements 309, 310, denoted by τε, being inserted in both signal paths between the last element of multiplexer 301 and delay element 308 and the respective XNOR gate 306, 307 of the arbiter RS FF 302. A switching signal T1 is fed to the first switchable delay element 309, which is arranged upstream of the first XNOR gate 306, and a switching signal T0 is fed to the second switchable delay element 310, which is arranged upstream of the second XNOR gate 307.

For Tj=0 (j=1, 0), the switchable delay element 309, 310 is in a state of minimal delay τ(0), while for Tj=1 (j=1, 0), the considered delay element τε is in a state of great delay τ(1)>>τ(0). The delay elements 309, 310 can also be configured in such a way that they have more than two delay setting states.

According to various embodiments, a PUF bit is considered stable if and only if the same result is stored in the arbiter RS FF 302 for both (T1=1, T0=0) and (T1=0, T0=1). This preselection of stable bits means that the faster signal path must be faster than the slower signal path at least by τ(1)−τ(0) for a PUF bit corresponding to a certain challenge, i.e., a certain input vector (X(0), . . . , X(N−1)) for a certain value for E, to be classified as a stable, and hence valid, PUF bit. Otherwise, it is discarded, i.e., the corresponding input vector (X(0), . . . , X(N−1)) is marked as invalid or irrelevant during the registration phase of the PUF and is discarded and not taken into account in the PUF evaluation/reconstruction phase.

In contrast to the PUF bit registration, both switchable delay elements 309, 310 are switched to the minimum delay τ(0) by feeding T1=0 and T0=0 for all valid PUF bits during the PUF reconstruction in order to profit from the high bit stability of the valid PUF bits.

Figure 4:
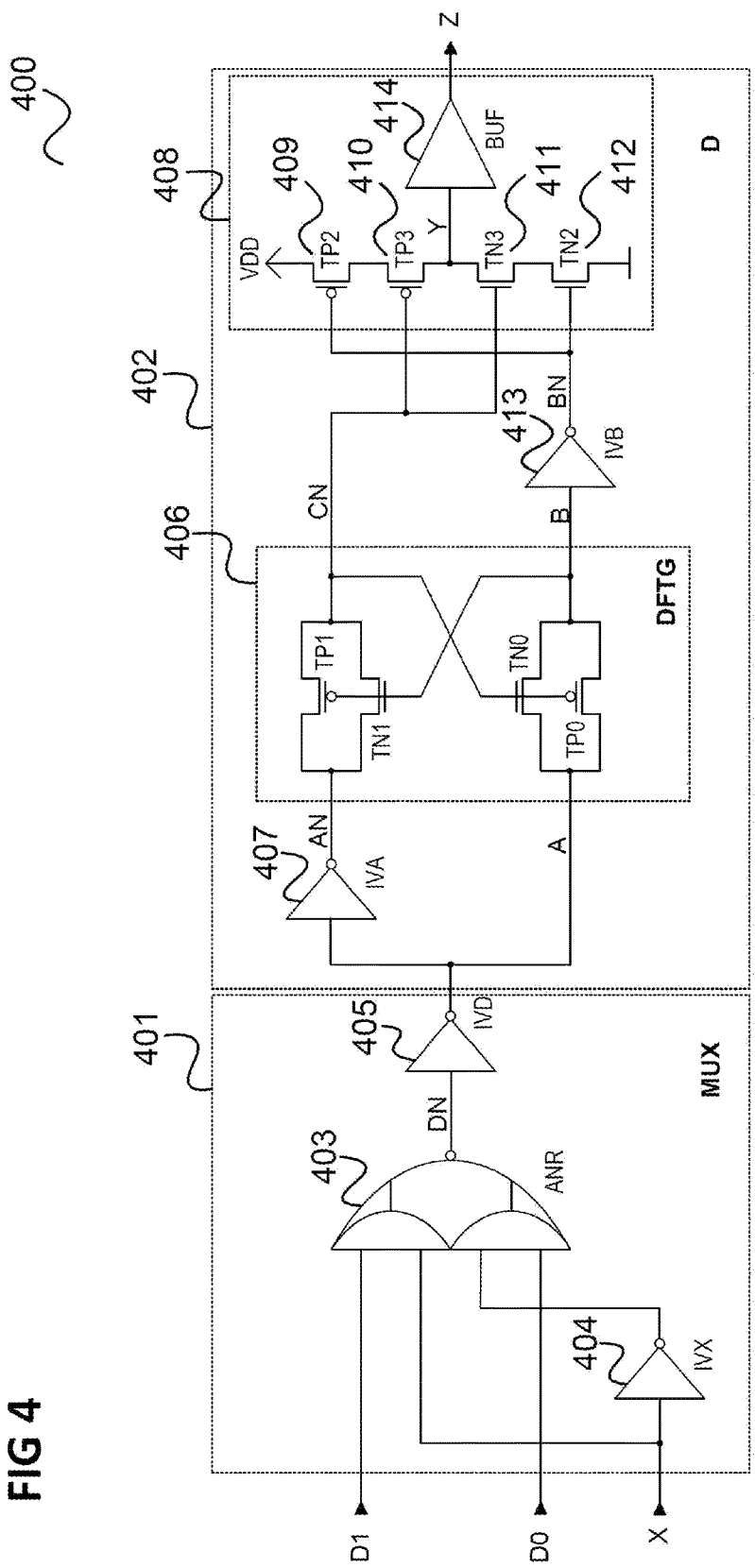
FIG. 4 shows an example of a circuit which implements an element made of multiplexer and delay element.

FIG. 4 shows an example of a circuit which implements an element made of multiplexer 401 and delay element 402, which can be used in each case in the circuit 300 for the combination of multiplexer 301 and downstream delay element 308.

The multiplexer 401 has a complex gate 403 with four inputs, which ANDs its first input and its second input and which ANDs its third input and its fourth input and which NORs the results of the two AND combinations. The first input and the fourth input of the complex gate 403 correspond to the data inputs of the multiplexer 401, the respective control bit X(j) is fed to the second input and the control bit X(j) inverted by the first inverter 404 is fed to the third input. The output signal of the complex gate 403 is inverted by a second inverter 405 and fed to the delay element 402 is an input signal.

The delay element 402 has a transfer gate 406 with two inputs. The input signal of the delay element 402 inverted by a third inverter 407 is fed to the first input of the transfer gate 406 and the input signal of the delay element 402 is fed to the second input of the transfer gate 406.

Further, the delay element 402 has an output circuit 408 with four field-effect transistors (FETs) 409 to 412: the source of a first p-channel FET 409 is connected to the high supply potential and its drain is connected to the source of a second p-channel FET 410, the drain of which is connected to the drain of a first n-channel FET 411. The source of the first n-channel FET 411 is connected to the drain of a second n-channel FET 412, the source of which is connected to the low supply potential.

The transfer gate 406 has a first output, which is connected to the gate of the second p-channel FET 410 and to the gate of the first n-channel FET 411. Moreover, the transfer gate 406 has a second output, which is connected to the gate of the first p-channel FET 409 and the gate of the second n-channel FET 412 via a fourth inverter 413.

The connection between the drain of the second p-channel FET 410 and the drain of the first n-channel FET 411 is connected to the input of a buffer 414, the output of which is the output of the output circuit 408 and of the delay element 402.

The transfer gate 406 and, in particular, its unusual transfer behavior is described in more detail below.

Figure 5:
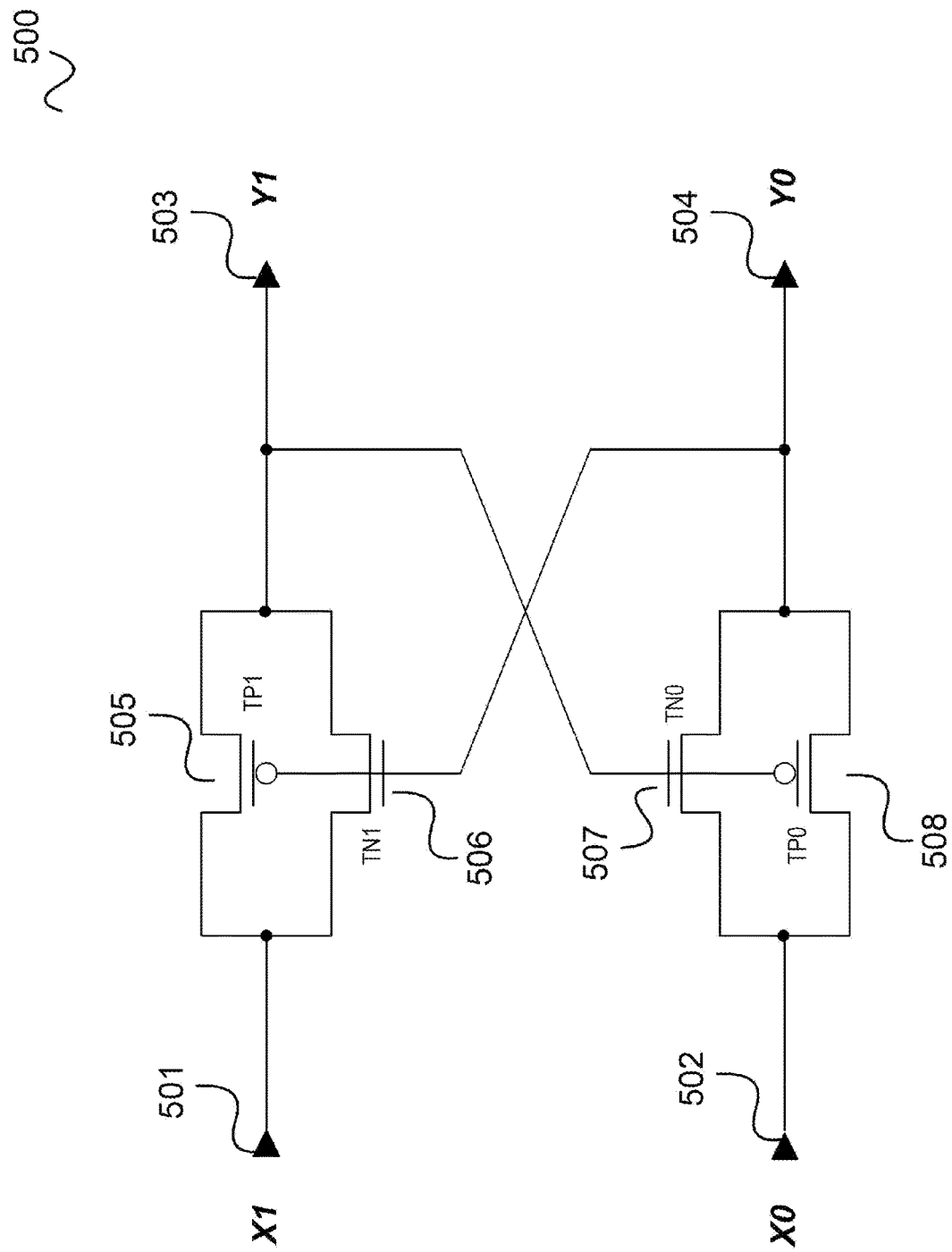
FIG. 5 shows an exemplary transfer gate, also referred to as a differential feedback transfer gate (DFTG).

FIG. 5 shows a transfer gate 500, which is also referred to as a differential feedback transfer gate (DFTG) in accordance with exemplary embodiments of the present disclosure.

The transfer gate 500 has a first input node (first input) 501, denoted by X1, a second input node (second input) 502, denoted by X0, a first output node (first output) 503, denoted by Y1, and a second output node (second output) 504, denoted by Y0.

A first p-channel field-effect transistor 505 (denoted as TP1) is wired between the first input node 501 and the first output node 503. In parallel therewith, a first n-channel field-effect transistor 506 (denoted as TN1) is wired between the first input node 501 and the first output node 503.

A second n-channel field-effect transistor 507 (denoted as TN0) is wired between the second input node 502 and the second output node 504. In parallel therewith, a second p-channel field-effect transistor 508 (denoted as TP0) is wired between the second input node 502 and the second output node 504.

The first output node 503 is fed back to the gates of the second n-channel field-effect transistor 507 and of the second p-channel field-effect transistor 508.

The second output node 504 is fed back to the gates of the first p-channel field-effect transistor 505 and of the first n-channel field-effect transistor 506.

The DFTG 500 is a CMOS circuit, for example. Accordingly, the FETs are MOSFETs (metal-oxide semiconductor FETs), for example. The DFTG 500 has an unusual transition characteristic when switching between its two stable states: the two n-channel MOSFETs 506, 507 and the two p-channel MOSFETs 505, 508 of the DFTG 500 are in weak inversion during more than 90% of the transition time, wherein one of the n-channel MOSFETs and one of the p-channel MOSFETs initially block one another while they subsequently assist one another in order to achieve the respective new equilibrium state of the DFTG 500.

The DFTG 500 is neither a conventional analog circuit nor is it a digital gate. Rather, it is an analog-digital hybrid circuit. In particular, its actual transition properties differ from those of regular CMOS gates.

This relates, for example, to the very strong dependence on the process technology (and the temperature and the supply voltage) since the dependence of the CMOS threshold voltages of the DFTG 500 is amplified exponentially by unpredictable local variations of channel and/or halo implant concentrations in the case of a weak inversion. Therefore, the DFTG transition times can be considered to have a log-normal distribution for the normally distributed CMOS threshold voltages. Monte Carlo simulations and measurements confirm this.

In comparison to regular CMOS gates, these transition properties yield a drastically increased sensitivity of the delay differences of the DFTG gates of a pair of "identical" DFTG gates in relation to process variations.

Therefore, the DFTG circuits are suitable for the purpose of extremely sensitive delay and cell-based PUFs (e.g. arbiter PUFs), which require no error correction on account of their high reproducibility and their easy-to-implement preselection (all potentially unstable bits are masked). Moreover, the DFTG-based arbiter PUF elements can be placed irregularly over a chip on account of their its cell-based and robust nature, as a result of which the physical access for each attacker becomes extremely difficult and cumbersome.

Below, the assumption is made that the logical value 0 corresponds to the lower supply potential VSS and that the logical value 1 corresponds to the upper supply potential VDD.

Moreover, the assumption is made that the node pairs (X1, X0) and (Y1, Y0) are each able to adopt the two complementary equilibrium states (1, 0) and (0, 1) and that there is switching back-and-forth between these two states (in each case by suitable actuation from the outside via (X1, X0) (or (Y1, Y0))), wherein (X1, X0) form the input node pair and (Y1, Y0) form the output node pair in the mode of operation described below.

As is clear from FIG. 5, the transfer gate 500 has a symmetric construction in respect of interchanging nodes X1 and X0 (and Y1 and Y0), and so, without loss of generality, it suffices to consider the transition of (X1, X0) from (1, 0) to (0, 1) and the time response resulting therefrom of (Y1, Y0) during the transition from (1, 0) to (0, 1).

Figure 6:
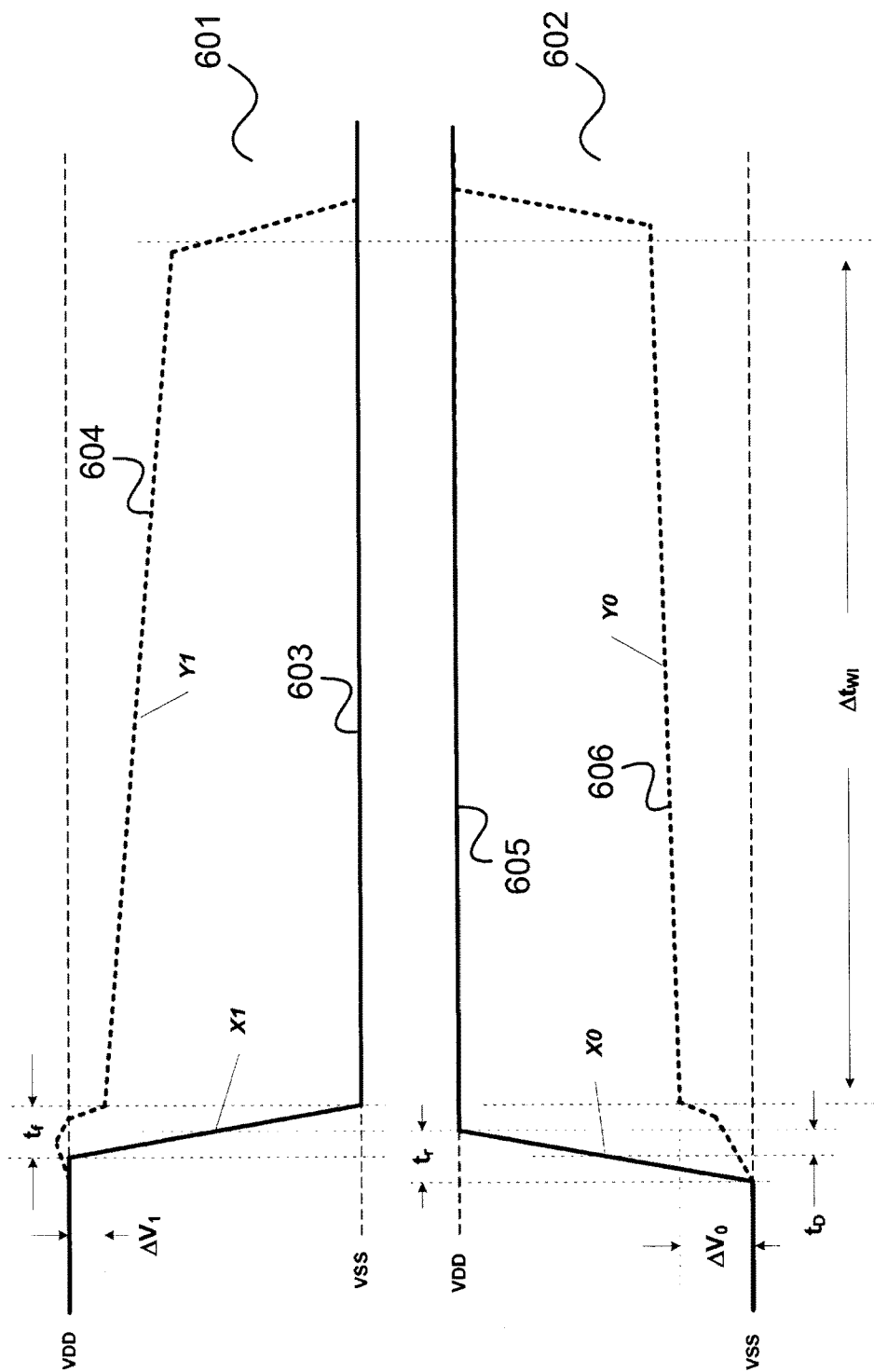
FIG. 6 shows the time response when switching over the input node pair of the transfer gate of FIG. 5.

FIG. 6 shows an exemplary time response for changeover of the input node pair (X1, X0) from (1,0) to (0,1).

In this case, a first diagram 601 shows the level profile of X1 in a first curve 603 and the level profile of Y1 in a second (dashed) curve 604.

A second diagram 602 shows the level profile of X0 in a third curve 605 and the level profile of Y0 in a fourth (dashed) curve 606.

The time increases from left to right in each of the graphs 601, 602, and the level (i.e., the respective node potential) increases from bottom to top in each case, moving between VSS and VDD according to the assumed logic levels.

As FIG. 6 shows, the transition of (Y1, Y0) from (1,0) to (0,1) does not take place in the manner of that of (X1, X0), that is to say does not take place with switching times $t_r$ and $t_f$, which are in the order of magnitude of 100 ps for standard CMOS in deep submicron technologies, for example. The input signals for the input nodes 501, 502 are provided by means of standard CMOS gates, for example.

After a short initial phase, during which the first p-channel transistor 505 and the second n-channel transistor 507 are still in strong inversion (SI), and after which the potential of Y1 has fallen by $\Delta V_1$ and that of Y0 has risen by $\Delta V_0$, all four transistors 505, 506, 507, 508 are in weak inversion (WI) and therefore operate below their respective threshold voltage (the threshold voltages are called Vth(P1), Vth(N1), Vth(P0), Vth(N0) in accordance with the designations of the transistors).

The accompanying comparatively small channel currents in turn result in the electrical (load) capacitances $C_Y$ (for example having the respective gate capacitances of the transistors and capacitances of nodes connected to the transfer gate 500 on the output side) connected to Y1 and Y0 being able to undergo charge reversal only very slowly, which means that a much longer time interval $\Delta T_{WI}$ elapses in comparison with standard CMOS switching times before the potentials at Y1 and Y0 have reached values that allow the transition from weak inversion to strong inversion for the first n-channel transistor 506 and the second p-channel transistor 508: Y0 has then risen to approximately Vth(N1) and Y1 has then fallen to approximately VDD−|Vth(P0)|.

The result is thus that the reciprocal negative feedback from Y1 to the gate connections of the second p-channel transistor 508 and of the second n-channel transistor 507 and/or from Y0 to the gate connections of the first p-channel transistor 505 and of the first n-channel transistor 506 (there also being capacitive coupling between Y1 and Y0 via the gate capacitances of the transistors 505, 506, 507, 508, which is indicated in FIG. 5 by the overshoot in Y1 during $t_f$) initially results in mutual obstruction of the charge transport. However, the same negative feedback also means mutual support for the non-equilibrium state that lasts $\Delta t_{WI}$ (that is to say the phase of weak inversion, during which none of the transistors 505, 506, 507, 508 is in strong inversion) moving in the direction of the new equilibrium state (in which (Y1, Y0) assumes the state (0,1)) until one of the threshold voltages of the first n-channel transistor 506 or of the second p-channel transistor 508 has been reached, whereupon the respective other threshold voltage is then also very quickly exceeded and immediately thereafter (Y1, Y0) adjusts itself to (0,1).

The DFTG switching processes from (1,0) to (0,1) and from (0,1) to (1,0) are thus practically exclusively dependent on the weak-inversion response of the transistors 505, 506, 507, 508 (wherein the attainment of $\Delta V_1$ or $\Delta V_0$ is followed by the first p-channel transistor 505 and the second n-channel transistor 507 now contributing only little to the charge reversal of the output nodes 503, 504 owing to very rapidly, on account of their source diodes and drain bulk diodes that are then reverse-biased).

It is subsequently assumed that the transistors 505, 506, 507, 508 are MOSFETs (metal-oxide semiconductor field-effect transistors).

For the channel current, e.g. of an nMOS transistor (i.e. n-channel MOSFET) in the weak inversion range, the following applies:

$$I_{DS} = 2\mu \cdot C_{ox} \frac{W}{L}\left(\frac{kT}{e}\right)^2 e^{\frac{V_{GS}-V_{th}}{kT}} \left\{ e^{\frac{-V_{SB}}{kT}} - e^{\frac{-V_{DB}}{kT}} \right\},$$

with the mobility μ, the specific gate capacitance $C_{ox}$, the width W and the length L of the gate, the Boltzmann constant k, the temperature T, the elementary charge e, the threshold voltage $V_{th}$ and the voltages $V_{GS}$, $V_{SB}$ and $V_{DB}$ between gate and source, source and bulk (substrate) and drain and bulk, respectively.

There are thus prevailing exponential dependences of the channel current on T and $V_{th}$ and also on the terminal voltages $V_{GS}$, $V_{SB}$ and $V_{DB}$, quite in contrast to the linear or quadratic dependences in the range of strong inversion.

The channel currents in the range of weak inversion are thus proportional to factors in the form $$e^{-\frac{\Delta E}{kT}} \text{ where } \Delta E = e \cdot (V_{th} - V_{GS})$$

(hence for quantum statistical residence probability for mobile charge carriers (electrons and holes) in the conduction or valence band).

At the start of the range of weak inversion, $V_{GS}^0 = \Delta V_0$ applies (for the first n-channel transistor 506) and $V_{GS}^0 = -\Delta V_1$ applies (for the second p-channel transistor 508).

With load capacitances $C_Y$ at Y1 and Y0 and from $$dt = C \cdot \frac{dV}{I(V)}$$

the following then applies:

$$\Delta t_{WI} = C_Y \cdot \int_{V_{GS}^0}^{V_{th}} \frac{dV_{GS}}{I(V_{GS})} \sim C_Y \cdot e^{\frac{e}{kT}(V_{th} - V_{GS}^0)}.$$

Since $V_{GS}^0$, and $\Delta V_1$, $\Delta V_0$ rise at greater VDD, there are thus exponential relationships between $\Delta t_{WT}$ and both T and VDD: both rising temperature and rising supply voltage VDD result in an exponential drop in $\Delta t_{WT}$. In respect of temperature dependence, this is enhanced further by the threshold voltage $V_{th}$, which decreases as temperature T rises.

The DFTG switching response ($\Delta V_1$, $\Delta V_0$ and particularly the switching time, which is determined substantially by $\Delta t_{WT}$) is thus significantly different than that of standard CMOS gates.

Monte Carlo simulations show that the standard deviation of DFTG transition times is at least ten times greater than the standard deviations of the delay times of regular CMOS gates and wiring lines, and significantly larger than the mean values (3 to 10-times greater) thereof. That is to say, the delay times of regular CMOS gates and wiring lines can be neglected in relation to the DFTG transition times, even for asymmetrical wiring. Therefore, the delays of the regular CMOS gates and the delays of the connecting lines can be neglected in relation to the delays by way of the delay buffers 402.

According to an embodiment, the values of $\Delta V_1$, $\Delta V_0$ and $\Delta t_{WT}$ are set by virtue of suitable selection of the following parameters for the respective desired instance of application:

W, L and $V_{th}$ (e.g. a high threshold voltage (high Vth) or a normal threshold voltage (standard Vth) for the transistors 505, 506, 507, 508 involved, depending on the instance of application;

selection of the substrate connections of the transistors 505, 506, 507, 508 (e.g., connection of the substrate connections of the p-channel transistors 505, 508 to VDD or Y1, Y0 etc. or connection of the substrate connections of the n-channel transistors 506, 507 to VSS or Y1, Y0);

selection of the rise and fall times $t_r$ and/or the delay $t_D$ for the input signals X1 and X0.

These parameters can be set individually for the transistors 505, 506, 507, 508. In particular, the transfer gate 500 can be designed asymmetrically for particular instances of application.

In the circuit of FIG. 4, the DFTG component 406 is connected by way of its second input X0 to the output of the multiplexer 401 and the first input X1 of said DFTG component is supplied with the inverse signal AN of the multiplexer output signal A, derived from A by the third inverter 407. The second output Y0 of the DFTG 406 is connected to the fourth inverter 413, the output signal BN of which is connected to the first input of the output circuit 408 (gates of the FETs 409, 412) and the first output Y1 of the DFTG 406 is connected to a second input of the output circuit 408 (gates of the FETs 410, 411). The output circuit 408 is a dual-gate inverter, the output of which is connected to the input of the buffer 414, which supplies the output signal of the circuit 400.

The third inverter 407 and the fourth inverter 413 cause the output circuit 408 only to change its state (i.e., switch the logic level of its output signal) after both DFTG output signals (CN and B in FIG. 4; outputs Y1 and Y0 in FIG. 5) have reached their stable state (e.g., changed their logic level) after a falling or rising edge (bringing about a logic level change) at the output of the multiplexer 405.

Since the DFTG state transition is very sensitive to variations (e.g., process variations), as explained above, this also applies to the entire delay element 402.

This means, in turn, that the introduction of the delay elements 402, as illustrated in FIG. 3, can bring about an increase in the bit stability and the statistical quality.

Moreover, a preselection of the complementary type is also possible and this is described below with reference to FIG. 3. The assumption is made that, for a given challenge X<n–1:0>, both paths through the circuit 300 are so slow on account of extreme process variations that the key reconstruction is impaired to an unacceptable extent. Then, both arbiter output signals Y<1> and Y<0> can be sampled with a predefined and adjustable cycle time $T_C$ during the registration for the purposes of producing the key such that the PUF bit is discarded in accordance with the provided challenge X<n–1:0> if both Y<1> and Y<0> are still in their pre-load state 0 at the time $T_C$, i.e., if Y<1:0>==00 at the sampling time $T_C$.

Figure 7:
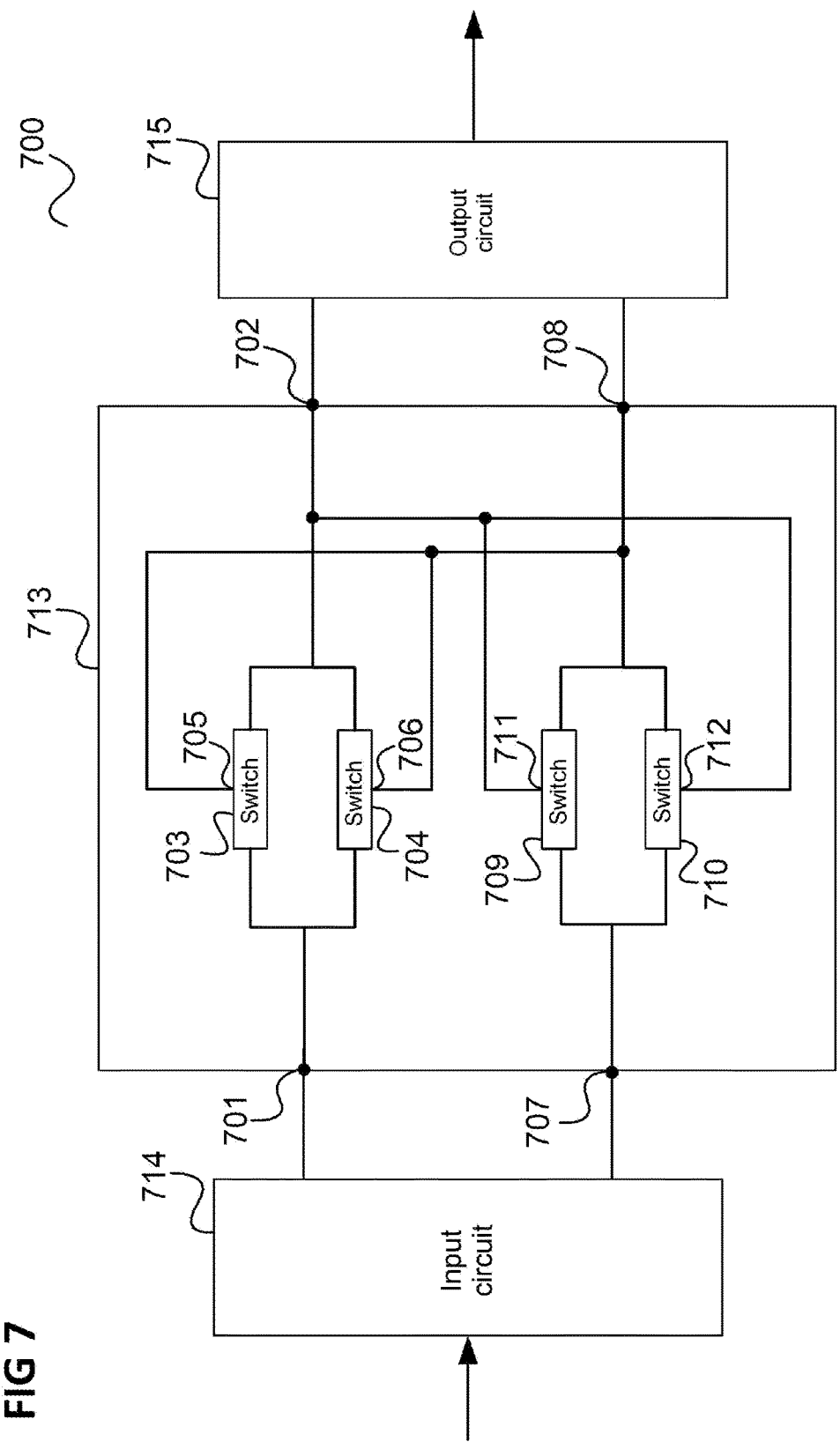
FIG. 7 shows an exemplary delay circuit.

In summary, a delay circuit, as illustrated in FIG. 7, is provided according to various embodiments.

FIG. 7 shows a delay circuit 700 in accordance with exemplary embodiments of the present disclosure.

The delay circuit 700 includes an electronic transmission element 713 with a first transmission element input 701 and a first transmission element output 702, wherein the first transmission element input 701 is coupled to the first transmission element output 702 by means of two first complementary switches 703, 704 wired in parallel, wherein the first switches 703, 704 each have a control input 705, 706, a second transmission element input 707 and a second transmission element output 708, wherein the second transmission element input 707 is coupled to the second transmission element output 708 by means of two second complementary switches 709, 710 wired in parallel, wherein the second switches 709, 710 each have a control input 711, 712.

The first transmission element output 702 is coupled to the control inputs 711, 712 of the second switches 709, 710 and the second transmission element output 708 is coupled to the control inputs 705, 706 of the first switches 703, 704.

The delay circuit 700 further includes an input circuit 714, configured to receive an input signal and feed the input signal to one of the transmission element inputs 701, 707 and feed the inverted input signal to the other of the transmission element inputs 701, 707.

Moreover, the delay circuit 700 includes an output circuit 715, coupled to the first transmission element output 702 and the second transmission element output 708 and configured to provide an output signal, wherein the output circuit 715 is configured in such a way that the output signal only changes in the case of a change in the input signal if the change in the input signal has brought about a change both at the first transmission element output 702 and at the second transmission element output 708.

Expressed differently, a transmission element is used in various embodiments, said transmission element having a log-normal-distributed transmission time between two inputs and two outputs, and a circuit is provided at the output, said circuit only changing its output logic level when a level change at the input of the transmission element has propagated to both outputs of the transmission element. This ensures a high sensitivity of the delay element to process variations, and so it is particularly suitable for the production of PUF values on a chip in order to prevent IC piracy.

Depending on a control signal, the change in the input signal can be a falling or a rising edge of the input signal. This can produce independent PUF values since, depending thereon, different transistors of the transmission element determine the time response.

By way of example, as described above, the delay circuit 700 can be used in a PUF arbiter circuit or else in a ring oscillator PUF circuit for producing PUF values. Alternatively, the delay circuit 700 can also be used in other circuits, for example in an oscillator whose frequency monitoring may serve, for example, to detect a light attack on an integrated circuit or, in general, to monitor the operating conditions of the integrated circuit.

Various exemplary embodiments are specified below.

Embodiment 1 is a delay circuit, as illustrated in FIG. 7.

Embodiment 2 is a delay circuit according to exemplary embodiment 1, wherein the changes in the input signal and in the output signal and also the changes at the first transmission element output and at the second transmission element output are logic level changes.

Embodiment 3 is a delay circuit according to exemplary embodiment 1 or 2, wherein the change in the input signal is a falling or a rising edge of the input signal.

Embodiment 4 is a delay circuit according to any one of exemplary embodiments 1 to 3, wherein the first transmission element output outputs a first transmission element output signal and the second transmission element output outputs a second transmission element output signal and wherein the output circuit has a buffer, the first transmission element output signal or the inverted second transmission element output signal being supplied to the input thereof if the change in the input signal has brought about a change both in the first transmission element output signal and in the second transmission element output signal.

Embodiment 5 is a delay circuit according to exemplary embodiment 4, wherein the output circuit and the buffer are configured in such a way that the buffer holds a value stored thereby if the logic level of the first transmission element output signal and of the second transmission element output signal are not complementary.

Embodiment 6 is a delay circuit according to exemplary embodiment 4 or 5, wherein the buffer is an inverter.

Embodiment 7 is a delay circuit according to any one of exemplary embodiments 1 to 6, wherein the change in the first transmission element output signal and in the second transmission element output signal is such that the first transmission element output signal and the second transmission element output signal have complementary logic levels after the change.

Embodiment 8 is a delay circuit according to any one of exemplary embodiments 1 to 7, wherein the output circuit is configured in such a way that it switches if the first transmission element output signal and the inverted second transmission element output signal have the same logic level.

Embodiment 9 is a delay circuit according to any one of exemplary embodiments 1 to 8, wherein the output circuit has an inverter with two inputs, configured to output the inverted logic level if the signals at the inputs have the same logic level.

Embodiment 10 is a delay circuit according to any one of exemplary embodiments 1 to 9, comprising an inverter arranged between the second transmission element output and the output circuit.

Embodiment 11 is a delay circuit according to any one of exemplary embodiments 1 to 10, wherein the input circuit has an inverter configured to invert the input signal, the output of said inverter being coupled to that one of the transmission element inputs that is fed with the inverted input signal by the input circuit.

Embodiment 12 is a delay circuit according to any one of exemplary embodiments 1 to 11, wherein the first switches and the second switches are transistors.

Embodiment 13 is a delay circuit according to any one of exemplary embodiments 1 to 12, wherein the first switches are an n-channel field-effect transistor and a p-channel field-effect transistor and the second switches are an n-channel field-effect transistor and a p-channel field-effect transistor and wherein the control inputs of the switches are the gate terminals of the field-effect transistors.

Embodiment 14 is a delay circuit according to any one of exemplary embodiments 1 to 13, wherein the first switches are configured in such a way that they switch at different times.

Embodiment 15 is a delay circuit according to any one of exemplary embodiments 1 to 14, wherein the first switches are configured in such a way that they switch at different levels of the second output node.

Embodiment 16 is a delay circuit according to any one of exemplary embodiments 1 to 15, wherein the second switches are configured in such a way that they switch at different times.

Embodiment 17 is a delay circuit according to any one of exemplary embodiments 1 to 16, wherein the second switches are configured in such a way that they switch at different levels of the first output node.

Embodiment 18 is a delay circuit according to any one of exemplary embodiments 1 to 17, wherein the first switches and the second switches are configured to switch between a first state and a second state in each case, wherein a switch conducts current better in the first state than in the second state.

Embodiment 19 is a delay circuit according to any one of exemplary embodiments 1 to 18, wherein the first switches and the second switches are field-effect transistors and are in strong inversion in the first state and in weak inversion or in the blocked state in the second state.

Embodiment 20 is a delay circuit according to any one of exemplary embodiments 1 to 19, wherein at least one of the first switches has a different embodiment to the second switches.

Embodiment 21 is a delay circuit according to any one of exemplary embodiments 1 to 20, wherein at least one of the first switches has different dimensions to the second switches.

Embodiment 22 is a PUF arbiter circuit having a multiplicity of delay circuits according to any one of exemplary embodiments 1 to 21.

Embodiment 23 is a PUF arbiter circuit according to exemplary embodiment 22, comprising a multiplicity of multiplexers, wherein one of the delay circuits is arranged at the output of each of the multiplexers.

Embodiment 24 is a PUF arbiter circuit according to exemplary embodiment 22 or 23, wherein the multiplexers and delay circuits form two chains depending on an input control signal and the PUF arbiter circuit further has a PUF arbiter input circuit configured to feed the input signal to the chains, wherein the change in the input signal is a falling or a rising edge of the input signal, depending on a control signal fed to the PUF arbiter input circuit.

According to one embodiment, a delay circuit is provided, having an electronic transmission element with a log-normal-distributed transmission time, at least one transmission element input and at least two transmission element outputs, and an output circuit, which is coupled to the transmission element outputs and configured to provide an output signal, wherein the output circuit is configured in such a way that the output signal only changes in the case of a change of an input signal supplied to the transmission element input if the change of the input signal has brought about a change at both transmission element outputs.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A delay circuit, comprising:
   an electronic transmission element with
      a first transmission element input and a first transmission element output, wherein the first transmission element input is coupled to the first transmission element output by means of two first complementary switches wired in parallel, wherein the first switches each have a control input;
      a second transmission element input and a second transmission element output, wherein the second transmission element input is coupled to the second transmission element output by means of two second complementary switches wired in parallel, wherein the second switches each have a control input;
   wherein the first transmission element output is coupled to the control inputs of the second switches and the second transmission element output is coupled to the control inputs of the first switches;
   an input circuit, configured to receive an input signal and feed the input signal to one of the transmission element inputs and feed the inverted input signal to the other of the transmission element inputs; and
   an output circuit, coupled to the first transmission element output and the second transmission element output and configured to provide an output signal, wherein the output circuit is configured in such a way that the output signal only changes in the case of a change in the input signal if the change in the input signal has brought about a change both at the first transmission element output and at the second transmission element output.

2. The delay circuit of claim 1,
   wherein the changes in the input signal and in the output signal and also the changes at the first transmission element output and at the second transmission element output are logic level changes.

3. The delay circuit of claim 1,
   wherein the change in the input signal is a falling or a rising edge of the input signal.

4. The delay circuit of claim 1,
   wherein the first transmission element output outputs a first transmission element output signal and the second transmission element output outputs a second transmission element output signal and wherein the output circuit has a buffer, the first transmission element output signal or the inverted second transmission element output signal being supplied to the input thereof if the change in the input signal has brought about a change both in the first transmission element output signal and in the second transmission element output signal.

5. The delay circuit of claim 4,
   wherein the output circuit and the buffer are configured in such a way that the buffer holds a value stored thereby if the logic level of the first transmission element output signal and of the second transmission element output signal are not complementary.

6. The delay circuit of claim 4,
   wherein the buffer is an inverter.

7. The delay circuit of claim 1,
   wherein the change in the first transmission element output signal and in the second transmission element output signal is such that the first transmission element output signal and the second transmission element output signal have complementary logic levels after the change.

8. The delay circuit of claim 1,
   wherein the output circuit is configured in such a way that it switches if the first transmission element output signal and the inverted second transmission element output signal have the same logic level.

9. The delay circuit of claim 1,
   wherein the output circuit has an inverter with two inputs, configured to output the inverted logic level if the signals at the inputs have the same logic level.

10. The delay circuit of claim 1, further comprising:
    an inverter arranged between the second transmission element output and the output circuit.

11. The delay circuit of claim 1,
    wherein the input circuit has an inverter configured to invert the input signal, the output of said inverter being coupled to that one of the transmission element inputs that is fed with the inverted input signal by the input circuit.

12. The delay circuit of claim 1,
wherein the first switches and the second switches are transistors.

13. The delay circuit of claim 1,
wherein the first switches are an n-channel field-effect transistor and a p-channel field-effect transistor and the second switches are an n-channel field-effect transistor and a p-channel field-effect transistor and wherein the control inputs of the switches are the gate terminals of the field-effect transistors.

14. The delay circuit of claim 1,
wherein the first switches are configured in such a way that they switch at different times.

15. The delay circuit of claim 1,
wherein the first switches are configured in such a way that they switch at different levels of the second output node.

16. The delay circuit of claim 1,
wherein the second switches are configured in such a way that they switch at different times.

17. The delay circuit of claim 1,
wherein the second switches are configured in such a way that they switch at different levels of the first output node.

18. The delay circuit of claim 1,
wherein the first switches and the second switches are configured to switch between a first state and a second state in each case;
wherein a switch conducts current better in the first state than in the second state.

19. The delay circuit of claim 1,
wherein the first switches and the second switches are field-effect transistors and are in strong inversion in the first state and in weak inversion or in the blocked state in the second state.

20. The delay circuit of claim 1,
wherein at least one of the first switches has a different embodiment to the second switches.

21. The delay circuit of claim 1,
wherein at least one of the first switches has different dimensions to the second switches.

22. A physical unclonable functions (PUF) arbiter circuit, comprising:
a multiplicity of delay circuits, each delay circuit comprising:
an electronic transmission element with
a first transmission element input and a first transmission element output, wherein the first transmission element input is coupled to the first transmission element output by means of two first complementary switches wired in parallel, wherein the first switches each have a control input;
a second transmission element input and a second transmission element output, wherein the second transmission element input is coupled to the second transmission element output by means of two second complementary switches wired in parallel, wherein the second switches each have a control input;
wherein the first transmission element output is coupled to the control inputs of the second switches and the second transmission element output is coupled to the control inputs of the first switches;
an input circuit, configured to receive an input signal and feed the input signal to one of the transmission element inputs and feed the inverted input signal to the other of the transmission element inputs; and
an output circuit, coupled to the first transmission element output and the second transmission element output and configured to provide an output signal, wherein the output circuit is configured in such a way that the output signal only changes in the case of a change in the input signal if the change in the input signal has brought about a change both at the first transmission element output and at the second transmission element output.

23. The physical unclonable functions arbiter circuit of claim 22, further comprising:
a multiplicity of multiplexers;
wherein one of the delay circuits is arranged at the output of each of the multiplexers.

24. The physical unclonable functions arbiter circuit of claim 22,
wherein the multiplexers and delay circuits form two chains depending on an input control signal and the PUF arbiter circuit further has a PUF arbiter input circuit configured to feed the input signal to the chains;
wherein the change in the input signal is a falling or a rising edge of the input signal, depending on a control signal fed to the PUF arbiter input circuit.

* * * * *